United States Patent [19]
Warren

[11] Patent Number: 5,699,870
[45] Date of Patent: Dec. 23, 1997

[54] ELECTRIC SHIFT TRANSFER CASE SYSTEM FOR AN AUTOMOBILE

[75] Inventor: James David Warren, Clayton, N.C.

[73] Assignee: Borg-Warner Automotive, Inc., Sterling Heights, Mich.

[21] Appl. No.: 432,961

[22] Filed: May 1, 1995

[51] Int. Cl.⁶ .................................................. B60K 17/354
[52] U.S. Cl. ...................... 180/247; 180/233; 364/424.1
[58] Field of Search .................................. 180/233, 247, 180/248, 249; 74/337.5; 192/3.55; 364/424.01, 424.1

[56] References Cited

U.S. PATENT DOCUMENTS

| | | | |
|---|---|---|---|
| 4,664,217 | 5/1987 | Welch et al. | 180/247 |
| 4,937,750 | 6/1990 | Gilliam | 364/424.1 |
| 4,989,686 | 2/1991 | Miller et al. | 180/197 |
| 5,033,575 | 7/1991 | Takeshita et al. | 180/233 X |
| 5,150,637 | 9/1992 | Ninomiya et al. | 74/335 |

FOREIGN PATENT DOCUMENTS

| | | |
|---|---|---|
| 0582415A1 | 2/1994 | European Pat. Off. . |
| WO9211476 | 7/1992 | WIPO . |

*Primary Examiner*—Anne Marie Boehler
*Assistant Examiner*—Victor E. Johnson
*Attorney, Agent, or Firm*—Reising, Ethington, Barnard & Perry, PLLC; Greg Dziegielewski

[57] ABSTRACT

An improved electric shift transfer case system (10) and electronic control circuit (16) therefor utilizes a microprocessor (73), interface circuit (72), and motor drive circuit (70) to control energization of a direct current electric shift motor (58) that is used to switch between drive modes in the transfer case (14) of a full or part-time four wheel drive vehicle. The motor drive circuit (70) includes four switching elements, such as transistors (74-77). The first and second switching elements connect respective first and second ones of the two motor terminals (58a,58b) to a supply voltage and the third and fourth switching elements connect the first and second motor terminals (58a,58b), respectively, to ground. The switching elements (74-77) each have a conductive state and non-conductive state selectable by a command input that is coupled to and controlled by data outputs of the microprocessor (73). The interface circuit (72) is connected between the microprocessor (73) and motor drive circuit (70) and is used to prevent the microprocessor (73) from commanding the motor drive circuit (70) into a short circuit condition or any other operating mode that involves an undesirable combination of conductive and non-conductive states of the switching elements (74-77).

8 Claims, 2 Drawing Sheets

ELECTRIC SHIFT TRANSFER CASE SYSTEM FOR AN AUTOMOBILE

TECHNICAL FIELD

The present invention relates generally to electric shift transfer cases for automobiles to permit electronic selection of one of a plurality of driving modes, such as two-wheel drive and four-wheel drive, and, more particularly, to such systems that utilize a direct current (dc) motor to shift between the different driving modes.

BACKGROUND OF THE INVENTION

Transfer cases are used in full and part-time four-wheel drive (4WD) vehicles to distribute driving power received on an input shaft from the vehicle's transmission to a pair of output drive shafts, one of which drives the vehicle's front wheels and the other of which drives the vehicle's rear wheels. In vehicles that permit shifting between two-wheel drive (2WD) and 4WD modes, the input shaft provides continuous drive power to one of the output shafts and selectively provides drive power to the other output shaft via some type of a disengagable or otherwise adjustable coupling, such as a viscous coupling, electromagnetic clutch, or positionable spur gearing. Other drive modes are sometimes provided, including four-wheel high (4H) for higher 4WD speeds, four-wheel low (4L) for lower 4WD speeds, neutral for disengaging the transmission from the front and rear axles to allow towing, and locked 4WD for controlling wheel slippage.

Historically, activation of the adjustable coupling to shift between drive modes has been accomplished manually using a mechanical shift actuator. Electronic control of the shift actuator is now more common, particularly for shift actuators that can be operated by a rotational source, such as an electric motor. U.S. Pat. No. 4,664,217, issued May 12, 1987 to D. W. Welch et al., provides one such example wherein a reversible dc electric motor is used to rotate a cammed shift actuator to selectively shift drive gearing within the transfer case between neutral, 2WD, and low and high speed 4WD modes. Selection of a desired drive mode is accomplished by operating the motor under control of a microprocessor based control circuit. The microprocessor commands a motor drive circuit that utilizes two relays to energize the motor to run in either the clockwise or counterclockwise direction, with the microprocessor determining the direction of rotation needed to achieve the desired drive mode. The motor can be run in one direction by using the relays to connect a first one of the motor terminals to a supply voltage (e.g., 12 v battery voltage) and to connect the second motor terminal to a common ground. Conversely, the motor can be run in the opposite direction by using the relays to switch the power connections to the motor so that the first terminal is connected to ground and the second terminal is connected to the supply voltage.

More recently, the motor drive circuits used for these reversible dc motors have utilized transistors or other semiconductor switches to selectively connect each of the motor terminals to either the supply voltage or common ground. The connection of these switches is sometimes referred to as an H-bridge because each end of the motor winding (i.e., each of the two motor terminals) is coupled to the supply voltage by one transistor and to the ground by another transistor, such that the resulting circuit schematically forms the shape of the letter "H". One advantage of this transistor implementation of the motor drive circuit is that it permits each motor terminal to not only be electrically connected to either the supply voltage or ground, but also to be electrically isolated from both (i.e., effectively open-circuited). By open-circuiting one of the two motor terminals following energization of the motor, the energy stored in the collapsing magnetic field can be dissipated through a clamping diode.

The ability to open-circuit each motor terminal, as well as connect that terminal to the supply voltage or ground, requires that each of the two transistors connected to that terminal be controlled by a separate command signal. This means that the two transistors at that terminal cannot simply be controlled by the same signal, or the logical inverse of a single signal, and the motor drive circuit therefore cannot be implemented in the same manner as the relays utilized in the above-noted Welch et al. patent. Rather, the motor drive circuit must have four command inputs, one for each transistor. Hence, prior art motor drive circuits have included four separate data outputs from the microprocessor, each one of which is connected to a different one of the four command inputs of the motor drive circuit.

One disadvantage of this implementation of the motor drive circuit is that separate control of the four transistors makes it possible to place the motor drive circuit into an undesirable state. Since each transistor can be switched between a conductive state and a non-conductive state independently of the other transistors, it is possible to provide a combination of logic levels on the command inputs that results in an undesirable combination of conductive and non-conductive states of the four transistors. For example, if both transistors connected to the first motor terminal are simultaneously commanded to turn on, the supply voltage will be short circuited, possibly causing the transistors or some other component to fail. There are other states possible that, while not likely to cause damage to the circuitry, are nonetheless unneeded and therefore undesirable. Thus, while certain combinations of the command inputs to the motor drive circuit result in desirable combinations of the conductive and non-conductive states of the drive transistors, other combinations of the command inputs result in undesirable combinations of the conductive and non-conductive states of the transistors.

Heretofore, the software controlling the microprocessor has been relied upon to prevent undesirable combinations of the motor circuit command inputs. However, inherent in this scheme is the possibility that undetected errors in programming could later lead to the motor drive circuit being commanded into one of the undesirable states discussed above. It would therefore be desirable to provide a control circuit for an electric shift transfer case system that permits selection of any of a number of desired combinations of the conductive and non-conductive states of the four motor drive semiconductor switches, but that is hardwired in such a manner as to prevent any undesirable combinations of the conductive and non-conductive states of those switches regardless of the state of the signals used to control those switches.

SUMMARY OF THE INVENTION

In accordance with the present invention there is provided an improved electronic control circuit for a direct current electric shift motor of a vehicle transfer case system. The electronic control circuit includes a microprocessor, motor drive circuit, and an interface circuit coupled between the microprocessor and motor drive circuit. The motor drive circuit has first and second output terminals for connection to the electric shift motor. It includes first, second, third, and fourth switching elements, with the first switching element coupled between the first output terminal and a supply voltage node, the second switching element coupled between the first output terminal and a ground node, the third switching element coupled between the second output terminal and the supply voltage node, and the fourth switching element coupled between the second output terminal and the ground node. The first, second, third, and fourth switching elements each have conductive and non-conductive states selectable by respective first, second, third, and fourth command inputs. As a result, certain combinations of voltage levels on the command inputs result in desirable combinations of conductive and non-conductive states of the switching elements and certain other combinations of voltage levels on the command inputs result in undesirable combinations of conductive and non-conductive states of the switching elements.

The control circuit is characterized by the interface circuit being connected between the microprocessor and the motor drive circuit, with the interface circuit being responsive to any combination of voltage levels on the data outputs of the microprocessor to provide a combination of voltage levels on the command inputs that results in one of the desirable combinations of conductive and non-conductive states of the switching elements, whereby the undesirable combinations of conductive and non-conductive states of the switching elements are prevented. Preferably, the switching elements comprise transistors or other semiconductor devices.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
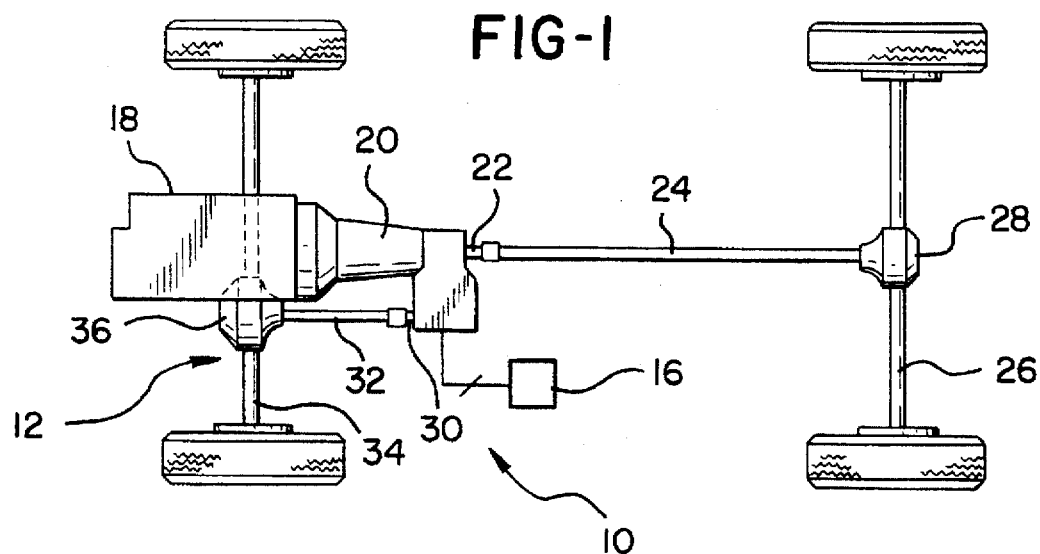
FIG. 1 is a top view of a vehicle drivetrain that includes an electric shift transfer case system of the present invention and that includes a schematic representation of an electronic control circuit used by the transfer case system.

As shown in FIG. 1, an electric shift transfer case system of the present invention, designated generally as 10, is shown connected as part of a vehicle drive train 12. Transfer case system 10 includes a transfer case 14 and an electronic control circuit 16 connected to transfer case 14 to control the drive mode provided by transfer case 14. As is common, drive train 12 includes an engine 18 that provides driving power to transfer case 14 via a transmission 20. A first output shaft 22 of transfer case 14 provides power to a rear driveshaft 24 that drives a rear axle 26 via a rear differential 28. A second output shaft 30 of transfer case 14 provides power to a front driveshaft 32 that drives a front axle 34 via a front differential 36. As will be discussed below, transfer case 14 provides various driving modes, such as two-wheel drive, neutral, and low and high speed four-wheel drive, with the shifting between drive modes being performed under the control of electronic circuit 16.

Figure 2:
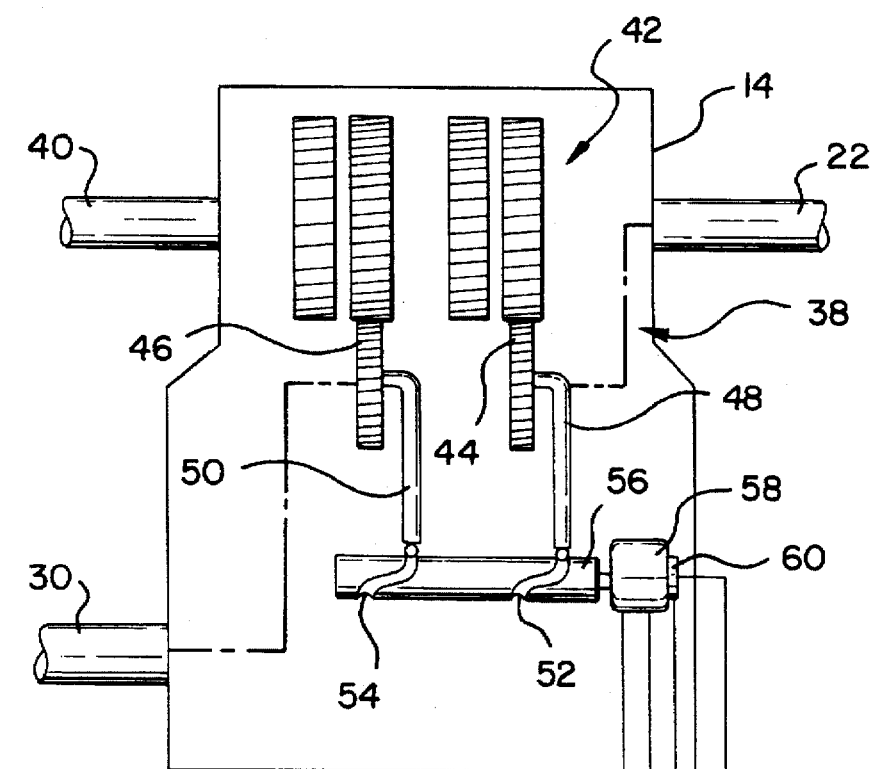
FIG. 2 is a partially schematic and partially diagrammatic illustration of the electric shift transfer case system of FIG. 1, including a transfer case and the electronic control circuit.
Figure 2:
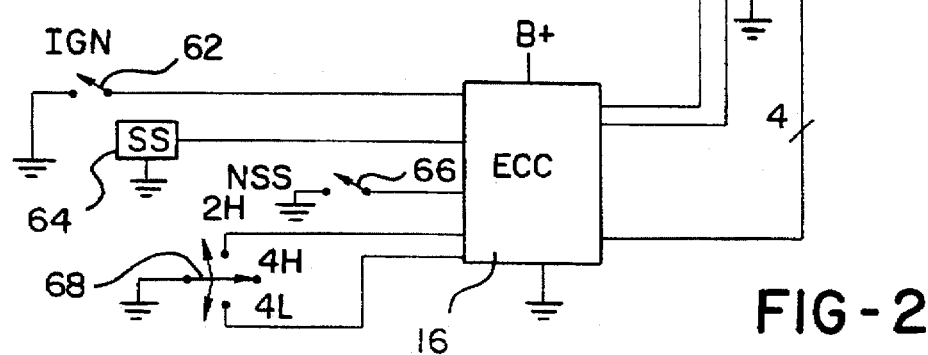

Referring now to FIG. 2, transfer case 14 and circuit 16 are shown in greater detail. An exemplary form of transfer case 14 is diagrammatically illustrated. In general, it includes a positionable spur gearing assembly 38 that permits selection of various drive modes by controlling the rotational position of a single shaft. In particular, it has an input shaft 40 from transmission 20 that drives a spur gearset 42. Rear output shaft 22 and front output shaft 30 are driven via a pair of respective gears 44 and 46 that can be selectively brought into and out of engagement with various gears within gearset 42 by a pair of respective actuator yokes 48 and 50. The different drive modes provided by transfer case 14 are selected by appropriate positioning of gears 44 and 46 with respect to gearset 42. Actuator yokes 48 and 50 are positionable using cams 52 and 54, respectively, which are attached to a rotatable shaft 56 that is driven by an electric motor 58 through a worm and gear (not shown) or other suitable speed reducer. Further details of transfer case 14, including positionable assembly 38 and motor 58, can be found in the above-noted U.S. Pat. No. 4,664,217, the complete disclosure of which is hereby incorporated by reference. Transfer case 14 can be Borg-Warner Transfer Case Part Nos. 44-08-000-001; 44-08-000-002; 44-21-000-001; and 44-21-000-002. Motor 58 is preferably a brushless dc motor, such as a Borg-Warner Shift Motor Part No. 44-08-648-001.

Operation of motor 58 in both the clockwise and counterclockwise directions is controlled by electronic circuit 16 using information provided to it from various sensors and switches. Feedback position information for shaft 56 is provided by a position encoder 60 that is attached to motor 58 to sense its rotational position. Circuit 16 receives five inputs: an ignition signal IGN, a vehicle speed signal, a neutral position signal, and a pair of mutually exclusive drive mode input signals that are used to indicate the operator's selection of two-wheel drive, four-wheel drive high, or four-wheel drive low. The ignition signal is derived from, and can come directly from, the vehicle's ignition switch 62. It is used to indicate the general operating state of the vehicle (i.e., whether the ignition system is on or off) so that circuit 16 knows when to switch into a low-power standby mode. The speed signal is provided by a magnetic pickup or other conventional speed sensor 64. It is used to provide circuit 16 with an indication of vehicle speed so that operation of motor 58 to shift between drive modes is carried out only under the speed conditions appropriate for the desired change in driving modes. The neutral position signal is provided by a neutral safety switch 66 that indicates whether or not transmission 20 is in neutral. The two drive mode signals are provided by a manually operated mode selection switch 68 that has a first selectable position for providing an active low two-wheel drive mode signal on one input of circuit 16, a second selectable, but unconnected position for selecting four-wheel high drive mode, and a third selectable position for providing an active low four-wheel low drive mode signal on a second input of circuit 16. Connection to circuit 16 of the second selectable position of switch 68 is unnecessary since circuit 16 recognizes the selection of four-wheel high drive mode by the absence of both of the two active low signals provided by switch 68. Specific implementations of the switches and sensors to generate the input signals used by circuit 16 and the particular use to which these signals is put by circuit 16 are well known to those skilled in the art, as exemplified by the discussion found in the above-noted U.S. Pat. No. 4,664, 217, which has been herein incorporated by reference.

Electronic circuit 16 can also be used to operate other electronically controlled devices (not shown) that are utilized within transfer case 14. For example, it can be used to operate a solenoid that controls a vacuum to engage the front hubs when changing from two to four-wheel drive. It can also be used to control a magnetic synchronizer clutch within transfer case 14 that is used to synchronize rotation of the non-engaged output drive shaft with the input drive shaft when switching from two to four-wheel drive. The use of electronic circuit 16 to control such devices is well-known to those skilled in the art.

Figure 3:
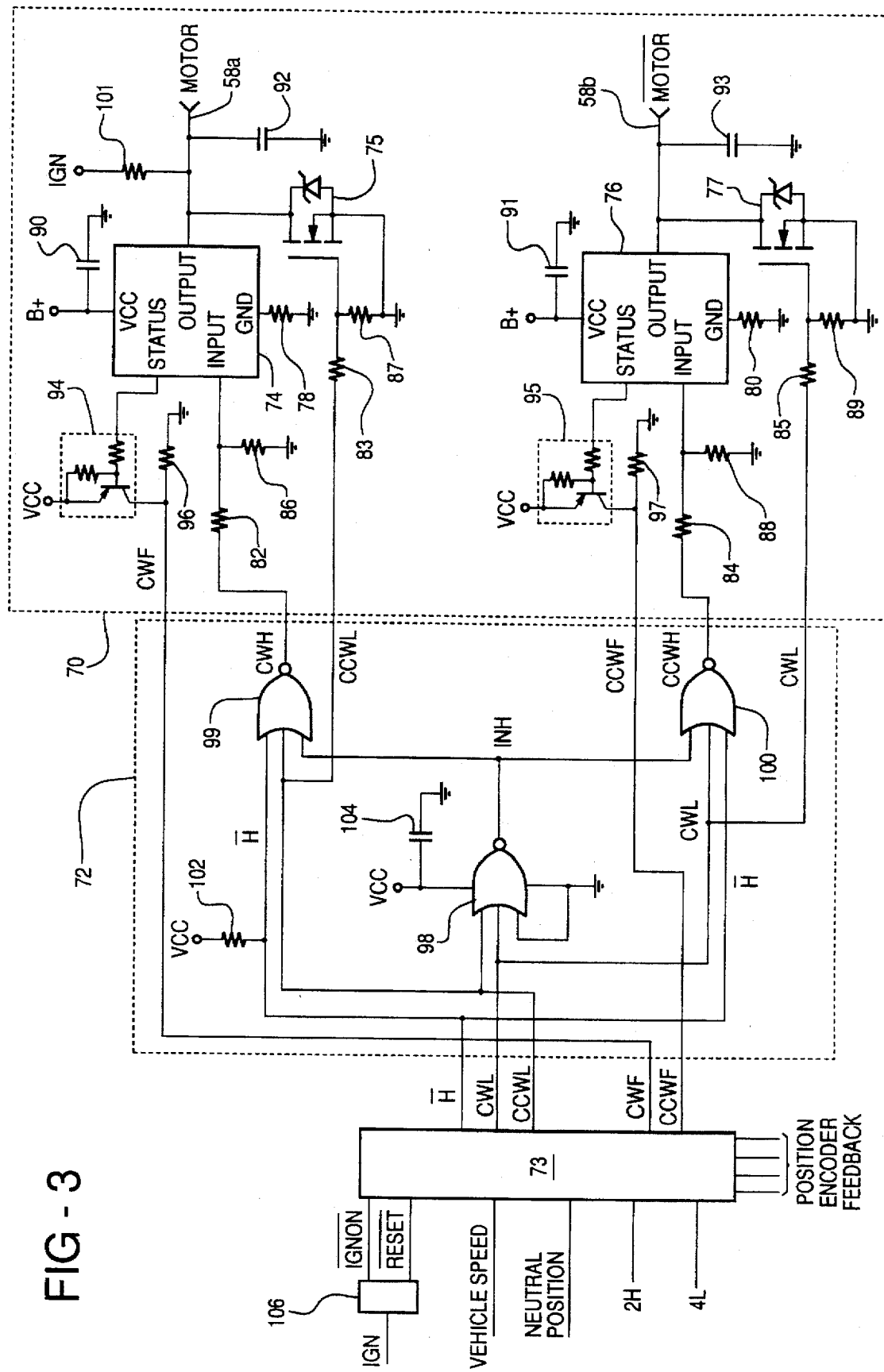
FIG. 3 is a schematic showing a motor drive circuit and an interface circuit used in the electronic control circuit of FIGS. 1 and 2.

Turning now to FIG. 3, there is shown a preferred embodiment of a motor drive circuit 70 and interface circuit 72 of the invention that are included as a part of electronic control circuit 16. In general, electronic circuit 16 is operated under control of a microprocessor 73 that accepts an ignition signal -IGNON, the vehicle speed signal, the neutral position signal, and the two drive mode signals, as well as feedback signals from position encoder 60. Microprocessor 73 controls motor drive circuit 70 via interface circuit 72 to operate motor 58 as necessary to shift between the various drive modes available. Supply power for microprocessor 73 comes from a voltage supply (VCC) that is derived from the vehicle battery. Consequently, microprocessor 73 is powered even when the vehicle ignition is off.

Motor drive circuit 70 provides operating current to motor 58 in either of two directions to provide bi-directional control of the rotation of motor 58. It receives four active high digital command input signals from interface circuit 72: CWH (clockwise high), CWL (clockwise low), CCWH (counter-clockwise high), and CCWL (counter-clockwise low). Each of these signals is used to control the conductive state of a different one of four semiconductor switches 74-77. Semiconductor switches 74 and 76 can be special-purpose high side driver chips, such as VN21 chips, manufactured by SGS Thompson. These chips are essentially transistors that provide current limiting and a status feedback indicative of the load seen at the chip's output. Semiconductor switches 75 and 77 can be MOSFETs, such as IRLZ44 transistors, manufactured by International Rectifier.

Transistor 74 receives input command signal CWH and responds to assertion of that signal to provide a low impedance electrical path between the vehicle battery supply voltage B+ and a first lead 58a of motor 58. Similarly, transistor 76 receives input command signal CCWH and responds to assertion of that signal to electrically connect supply voltage B+ to a second lead 58b. When CWH and CCWH are not asserted, transistors 74 and 76 electrically isolate their respective leads 58a and 58b from supply voltage B+. Transistors 74 and 76 include a ground connection through respective low valued resistances 78 and 80 so that they can provide high-side switching of power to motor 58 using active high input signals. Transistor 75 receives input command signal CCWL and responds to assertion of that signal to provide a low impedance electrical connection between motor lead 58a and ground. Similarly, transistor 77 receives input command signal CWL and responds to assertion of that signal to electrically connect motor lead 58b to ground. As with transistors 74 and 76, these transistors electrically isolate their associated motor leads when their input command signal is not asserted.

It should now be apparent that, within motor drive circuit 70, the conductive state of each of the transistors 74-77 is selectively and independently controlled by the digital signal appearing on its associated command input. This means that any combination of connections of motor leads 58a and 58b to the supply voltage B+ or ground, or neither, is possible. As is known to those skilled in the art, this permits operation of motor 58 in either direction, demagnetization of motor 58, as well as braking of motor 58.

Operation of motor 58 in the clockwise direction is achieved by asserting CWH and CWL (i.e., providing a logic high level to transistors 74 and 77) while not asserting either CCWH or CCWL (i.e., providing a logic low level to transistors 75 and 76). Operation of motor 58 in the opposite (counter-clockwise) direction requires the opposite input signals; namely, assertion of CCWH and CCWL and non-assertion of CWH and CWL. Braking is used to bring motor 58 to a quick stop and is achieved by connecting both motor leads 58a and 58b to a common node, such as supply voltage B+ or ground, so as to short circuit leads 58a and 58b. Demagnetization is used to dissipate in a controlled way the energy stored in the magnetic field of the coil in motor 58. It is achieved as a part of deenergizing motor 58 by changing the asserted high side command signal (either CWH or CCWH) to a logic low level, while maintaining the low side command signal (CWL or CCWL) asserted. In this way, any induced voltage spike resulting from the interruption of current flow through the high side transistor will be clamped to ground by the intrinsic diode within the low side transistor that is connected to the motor lead at which the spike appears. For example, if motor 58 is running in the clockwise direction (i.e., CWH and CWL are asserted and CCWH and CCWL are not), deenergization of motor 58 can be accomplished by leaving CWL at a logic high level and changing CWH to a logic low level. Transistor 74 will then turn off, resulting in a negative voltage spike at motor lead 58a. This voltage spike will be clamped to ground by the diode intrinsic to transistor 75. Following this demagnetization state of motor driver circuit 70, both transistors 75 and 77 are asserted to provide the braking discussed above. Preferably, demagnetization is carried out for two hundred microseconds, followed by four hundred milliseconds of braking.

The command inputs of motor drive circuit 70 each include a current limiting input resistor 82–85, as well as a pulldown resistor 86–89 connected to the input of transistors 74–77, respectively. The relative values of the current limiting and pulldown resistors are selected so as not to have a significant voltage divider effect and, in any event, so that the voltage level resulting from a logic high level input signal is greater than the transistor's input threshold voltage. The supply voltage connections of transistors 74 and 76 are each protected from transients by capacitors 90 and 91 that are connected to ground. Similarly, the two output nodes of circuit 70 that are connected to motor leads 58a and 58b include respective capacitors 92 and 93 connected to ground to provide EMI suppression.

Feedback information is provided from status outputs on transistor chips 74 and 76. These outputs are inverted by pnp transistors 94 and 95, respectively, which can be MUN2114T1 transistors, manufactured by Motorola. Pulldown resistors 96 and 97 are used to provide a logic low level on the feedback outputs CWF and CCWF, respectively, when transistors 94 and 95 are non-conducting. The feedback information provided by transistor chips 74 and 76 tell microprocessor 73 whether there is an external load at the transistor outputs of those chips. When motor 58 is not being operated in one of its modes (i.e., the motor-off condition), this load is provided by a resistor 101 between the transistor output of transistor chip 74 and the ignition signal IGN. This feedback information is used by microprocessor 73 to monitor the operation of motor 58 and detect the occurrence of any fault conditions.

The four inputs to motor drive circuit 70 provide a total of sixteen possible operating states of motor drive circuit 70 or, in other words, a total of sixteen possible combinations of the conductive and non-conductive states of transistors 74–77. As discussed above, some of these combinations are desirable and others are not. These sixteen combinations and the resulting operating states are listed below in Table 1.

TABLE 1

| INPUTS | | | | | |
|---|---|---|---|---|---|
| CWH | CWL | CCWH | CCWL | RESULTS | DESIRED |
| 0 | 0 | 0 | 0 | Motor Off | Yes |
| 0 | 0 | 0 | 1 | Motor CCW Demagnetization | Yes |
| 0 | 0 | 1 | 0 | Motor CCW High Switch On | No |
| 0 | 0 | 1 | 1 | Motor On in CCW Direction | Yes |
| 0 | 1 | 0 | 0 | Motor CW Demagnetization | Yes |
| 0 | 1 | 0 | 1 | Motor Brake | Yes |
| 0 | 1 | 1 | 0 | CCW Short Circuit | No |
| 0 | 1 | 1 | 1 | CCW Short Circuit | No |
| 1 | 0 | 0 | 0 | Motor CW High Switch On | No |
| 1 | 0 | 0 | 1 | CW Short Circuit | No |
| 1 | 0 | 1 | 0 | High Side Brake | No |
| 1 | 0 | 1 | 1 | CW Short Circuit | No |
| 1 | 1 | 0 | 0 | Motor On in CW Direction | Yes |
| 1 | 1 | 0 | 1 | CW Short Circuit | No |
| 1 | 1 | 1 | 0 | CCW Short Circuit | No |
| 1 | 1 | 1 | 1 | CW and CCW Short Circuit | No |

Interface circuit 72 provides a hardwired limitation on the possible combinations motor drive circuit operating states selectable by microprocessor 73. It insures that, regardless of the combination of commands provided by microprocessor 73, motor drive circuit 70 is operated only using one of the desirable combinations of its input signals. This is accomplished in the illustrated embodiment by providing hardwired control of the high-side transistors 74 and 76 using three software generated commands provided by microprocessor 73. As shown in FIG. 3, these three commands are provided on data outputs of microprocessor 73 and are labelled by signal names CWL, CCWL, and -H (not H). CWL and CCWL are the same signals used to drive transistors 77 and 75, respectively. They are provided to both motor drive circuit 70 and interface circuit 72. -H is an active-low enable signal for the high-side transistors 74 and 76. When not asserted (i.e., when at a logic high level), it tells interface circuit 72 that assertion of either CWL or CCWL is only for the purpose of demagnetization or braking. When asserted, it tells interface circuit 72 that motor 58 should be operated in the direction corresponding to whichever of the other two data outputs signals is asserted (i.e., clockwise if CWL is asserted and counter-clockwise if CCWL is asserted).

More specifically, interface circuit 72 uses -H in combination with CWL and CCWL to generate the CWH and CCWH signals needed to operate transistors 74 and 76, respectively. As shown in Table 2, below, it provides only those six combinations of motor drive circuit input signals that are listed in Table 1 as being desirable.

TABLE 2

| INPUTS | | | OUTPUTS | | | | |
|---|---|---|---|---|---|---|---|
| -H | CWL | CCWL | CWH | CWL | CCWH | CCWL | RESULTS |
| 0 | 0 | 0 | 0 | 0 | 0 | 0 | Motor Off |
| 0 | 0 | 1 | 0 | 0 | 1 | 1 | Motor On in CCW Direction |
| 0 | 1 | 0 | 1 | 1 | 0 | 0 | Motor On in CW Direction |
| 0 | 1 | 1 | 0 | 1 | 0 | 1 | Motor Brake |
| 1 | 0 | 0 | 0 | 0 | 0 | 0 | Motor Off |
| 1 | 0 | 1 | 0 | 0 | 0 | 1 | Motor CCW Demagnetization |
| 1 | 1 | 0 | 0 | 1 | 0 | 0 | Motor CW Demagnetization |
| 1 | 1 | 1 | 0 | 1 | 0 | 1 | Motor Brake |

Interface circuit 72 is implemented in the illustrated embodiment using three, three-input NOR gates 98–100. Each of these NOR gates can be implemented as one third of a 74HC27. NOR gate 98 is configured to operate as a two-input NOR gate and therefore has one of its inputs connected to ground. It receives CWL on a second input and CCWL on its third input and is used to generate an inhibit signal INH that is provided to NOR gates 99 and 100 whenever both CWL and CCWL are not being asserted. NOR gate 99 is used to generate CWH and for this purpose receives -H, CCWL, and INH as its inputs. -H is used to prevent assertion of CWH when energization of motor 58 is not desired. CCWL is used to prevent assertion of CWH whenever microprocessor 73 specifies counter-clockwise rotation (i.e., whenever CCWL is asserted). INH is used to prevent assertion of CWH if microprocessor 73 has not specified clockwise operation (i.e., has not asserted CWL). Thus, NOR gate 99 only asserts CWH if motor operation is enabled (i.e., -H is low) and is specified as being in the clockwise direction (i.e., CWL is high) and not the counter-clockwise direction (i.e., CCWL is low). Similarly, NOR gate 100 is used to generate CCWH and for this purpose receives -H, CWL, and INH. It only asserts CCWH if motor operation is enabled (i.e., -H is low) and is specified as being in the counter-clockwise direction (i.e., CCWL is high) and not the clockwise direction (i.e., CWL is low).

The -H output of microprocessor 73 includes a pullup resistor 102. As discussed above, the CWL and CCWL signal lines have pulldown resistors 89 and 87, respectively. A capacitor 104 connected to the VCC input of the NOR gate chip provides instantaneous energy for switching of NOR gates 98–100. Tables 3 and 4 below provide highly preferred values of the resistors and capacitors used in motor drive circuit 70 and interface circuit 72.

TABLE 3

| RESISTORS | |
|---|---|
| Ref. # | Value |
| 78 | 47 Ω |
| 80 | 47 Ω |
| 82 | 1K Ω |
| 83 | 1K Ω |
| 84 | 1K Ω |
| 85 | 1K Ω |
| 86 | 100K Ω |
| 87 | 47K Ω |
| 88 | 100K Ω |
| 89 | 47K Ω |
| 96 | 3.3K Ω |

TABLE 3-continued

RESISTORS

| Ref. # | Value |
| --- | --- |
| 97 | 3.3K Ω |
| 102 | 47K Ω |

TABLE 4

CAPACITORS

| Ref. # | Value |
| --- | --- |
| 90 | 0.1 μF |
| 91 | 0.1 μF |
| 92 | 100 pF |
| 93 | 100 pF |

As will be appreciated to those skilled in the art, microprocessor 73 provides commands to motor drive circuit 70 and interface circuit 72 under the control of a suitable computer program. The programming of microprocessor 73 to generate the desired commands in response to the various inputs discussed above is well within the level of skill in the art and will therefore not be further elaborated upon here. Preferably, microprocessor 73 comprises an MC68HC705C4, manufactured by Motorola.

Interface circuit 72 provides a duality of advantages. First, it provides a hardwired circuit that prevents the generation of an undesirable combination of motor drive circuit input signals, regardless of the combination of commands provided by microprocessor 73. In other words, although the three command signals provided by microprocessor 73 provide a total of eight possible command combinations, only the six desirable combinations of input commands to motor drive circuit 70 will be generated by interface circuit 72. In more general terms, the interface circuit permits use of n commands to control a motor drive circuit having only $2^n-m$ desirable combinations of input commands, where $0 \leq m < 2^{n-1}$. As will be appreciated, this permits selection of any of the desirable operating states of the motor drive circuit using the minimum possible number of command bits necessary. Second, by minimizing the number of command signals necessary to operate the motor drive circuit, the number of microprocessor data outputs required can be minimized. In the illustrated embodiment, only three such outputs are needed to provide the desirable combinations of commands to the four transistors 74–77.

Preferably, electronic circuit 16 includes a reset circuit 106 that provides a hardware reset of microprocessor 73 whenever the vehicle ignition is switched on. This can be implemented using a combinational logic circuit that responds to the ignition signal IGN to generate a reset pulse that is provided to the microprocessor's reset input. Reset circuit 106 also uses IGN to generate -IGNON, which is an active low signal that indicates when the vehicle ignition is on. Resetting of microprocessor 73 is desirable because it permits the microprocessor to be held in a low quiescent current (standby) mode whenever vehicle ignition is off such that it can thereafter be woken up from that mode with its data outputs in a known and desirable state (e.g., motor off) when the vehicle ignition is switched on. Upon waking up, microprocessor 73 can enter an initialization routine which includes, among other known tasks, determining the current driving mode via position encoder 60 and determining the desired mode using switch 68. As a part of the reset circuit, microprocessor 73 can include an reset inhibit output that prevents the hardware reset if the ignition signal momentarily drops low while the microprocessor is in the middle of a task (such as commanding motor drive circuit 70 to switch driving modes). In this way, the reset circuit can avoid resetting microprocessor 73 while the transfer case is in an undefined state (i.e., in the middle of switching between driving modes).

It will thus be apparent that there has been provided in accordance with the present invention an electric shift transfer case system and electronic control circuit therefor which achieve the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. In an electric shift transfer case system (10) for an automobile having first and second electronically selectable drive modes, said electric shift transfer case system having a transfer case (14) and an electronic control circuit (16), said transfer case (14) having a rotatable input shaft (40), first and second rotatable output shafts (22,30), and a selectively engagable coupling (38) between said input shaft and said second output shaft to permit drive torque to be transferred from said input shaft to said second output shaft, said transfer case (14) further including a direct current electric shift motor (58) having first and second terminals (58a,58b) electrically connected to said electronic control circuit (16), with said electric shift motor being mechanically connected to said coupling (38) to shift the vehicle from the first drive mode to the second drive mode when rotating in a first direction and to shift the vehicle from the second drive mode to the first drive mode when rotating in a second direction, said electronic control circuit (16) having a microprocessor (73) and a motor drive circuit (70) with said motor drive circuit connected to said electric shift motor (58) and operable under control of said microprocessor to drive current through said electric shift motor in either of two directions to thereby rotate said electric shift motor in either of said first and second directions, said motor drive circuit (70) having a plurality of semiconductor switches (74–77) connected in circuit to selectively connect each of said terminals (58a,58b) of said electric shift motor (58) to a power source and to a return path for the power source, whereby said semiconductor switches (74–77) and said electric shift motor (58) together form an H-bridge, said motor drive circuit further including a command input for each of said semiconductor switches, each of said semiconductor switches being electronically switchable by its associated command input between an electrically conductive state and an electrically non-conductive state, whereby certain combinations of voltage levels on said command inputs result in desirable combinations of conductive and non-conductive states of said switching elements and certain other combinations of voltage levels on said command inputs result in undesirable combinations of conductive and non-conductive states of said semiconductor switches, said electronic control circuit (16) having an interface circuit (72) coupled to said command inputs of said motor drive circuit (70) and to a clockwise, counterclockwise, and enable output of said microprocessor (73), said interface circuit comprising a combinational logic circuit responsive to any combination of voltage levels on said clockwise, counterclockwise, and enable outputs to provide a combination of voltage levels on said command inputs that results in one of said desirable combinations of conductive and non-conductive states of said semiconductive switches (74–77), whereby said undesirable combinations of conductive and non-conductive states of said semiconductor switches are prevented;

wherein said electric shift transfer case system (10) is characterized by:

one of said semiconductor switches (74–77) being connected to receive said clockwise output, another of said semiconductor switches being connected to receive said counterclockwise output, and the remaining two of said semiconductor switches being connected to receive control signals that are generated by said interface circuit (72) using said enable output and at least one of said clockwise and counterclockwise outputs.

2. In an electric shift transfer case system (10) or an automobile having first and second electronically selectable drive modes, said electric shift transfer case system having a transfer case (14) and an electronic control circuit (16), said transfer case (14) having a rotatable input shaft (40), first and second rotatable output shafts (22,30), and a selectively engagable coupling (38) between said input shaft and said second output shaft to permit drive torque to be transferred from said input shaft to said second output shaft, said transfer case (14) further including a direct current electric shift motor (58) having first and second terminals (58a,58b) electrically connected to said electronic control circuit (16), with said electric shift motor being mechanically connected to said coupling (38) to shift the vehicle from the first drive mode to the second drive mode when rotating in a first direction and to shift the vehicle from the second drive mode to the first drive mode when rotating in a second direction, said electronic control circuit (16) having a microprocessor (73) and a motor drive circuit (70) with said motor drive circuit connected to said electric shift motor (58) and operable under control of said microprocessor to drive current through said electric shift motor in either of two directions to thereby rotate said electric shift motor an either of said first and second directions, said motor drive circuit (70) having a plurality of switching elements (74–77) connected in circuit to selectively connect each of said terminals (58a,58b) of said electric shift motor (58) to a power source and to a return path for the power source, said motor drive circuit further including a command input for each of said switching elements with said switching elements being electronically switchable by its associated command input between an electrically conductive state and an electrically non-conductive state, whereby certain combinations of voltage levels on said command inputs result in desirable combinations of conductive and non-conductive states of said switching elements and certain other combinations of voltage levels on said command inputs result in undesirable combinations of conductive and non-conductive states of said switching elements, said electronic control circuit (16) having an interface circuit (72) coupled to data outputs of said microprocessor (73) and said command inputs of said motor drive circuit (70), said interface circuit being responsive to any combination of voltage levels on said data outputs to provide a combination of voltage levels on said command inputs that results in one of said desirable combinations of conductive and non-conductive states of said switching elements (74–77), whereby said undesirable combinations of conductive and non-conductive states of said a switching elements are prevented;

wherein said electric shift transfer case system (10) is characterized by:

said interface circuit (72) being connected to said microprocessor to receive n commands from said microprocessor (73), wherein said motor drive circuit (70) has $2^n-m$ desirable combinations of conductive and non-conductive states of said switching elements (74–77), where m is an integer and $0<m<2^{n-1}$.

3. An electronic control circuit as defined in claim 2:

wherein said plurality of switching elements comprising first, second, third, and fourth switching elements (74–77), with said first switching element (74) coupled between said first terminal and the power source, said second switching element (75) coupled between said first terminal and the return path, said third switching element (76) coupled between said second terminal and the power source, and said fourth switching element (77) coupled between said second terminal and the return path; and.

wherein said desirable combinations of conductive and non-conductive states of said switching elements (74–77), include a clockwise rotation state, a counterclockwise rotation state, a motor brake state, and at least one demagnetization state, wherein said said motor brake state results from said first and third switching elements (74,76) being in a different state of conduction than said second and fourth switching elements (75,77), and wherein said demagnetization state results from one of said switching elements (74–77) being in said conductive state and the other three of said switching elements (74–77) being in said non-conductive state.

4. An electronic control circuit as defined in claim 3, wherein said desirable combinations of conductive said non-conductive states of said switching elements (74–77) include a clockwise demagnetization state and a counterclockwise demagnetization state, wherein said clockwise demagnetization state results from said one of said switching elements (74–77) being in said conductive state and the other three of said switching elements (74–77) being in said non-conductive state, and said counterclockwise demagnetization state results from a second one of said switching elements (74–77) being in said conductive state and the remaining three of said switching elements (74–77) being in said non-conductive state.

5. In an electronic control circuit (16) for a direct current electric shift motor (58) of a vehicle transfer case system (10), said electronic control circuit having a microprocessor (73) and a motor drive circuit (70);

said motor drive circuit (70) having first and second output terminals for connection to the electric shift motor (58) and including first, second, third, and fourth switching elements (74–77), with said first switching element (74) coupled between said first output terminal and a supply voltage node, said second switching element (75) coupled between said first output terminal and a ground node, said third switching element (76) coupled between said second output terminal and said supply voltage node, and said fourth switching element (77) coupled between said second output terminal and said ground node, said first, second, third, and fourth switching elements each having conductive and non-conductive states selectable by respective first, second, third, and fourth command inputs;

whereby certain combinations of voltage levels on said command inputs result in desirable combinations of conductive and non-conductive states of said switching elements (74–77) and certain other combinations of voltage levels on said command inputs result in undesirable combinations of conductive and non-conductive states of said switching elements; and said microprocessor (73) having a plurality of data outputs coupled to said command inputs;

said electronic control circuit (16) having an interface circuit (72) connected between said microprocessor (73) and said motor drive circuit (70), said interface circuit being responsive to any combination of voltage levels on said data outputs to provide a combination of voltage levels on said command inputs that results in one of said desirable combinations of conductive and non-conductive states of said switching elements (74–77), whereby said undesirable combinations of conductive and non-conductive states of said switching elements are prevented;

wherein said electronic control circuit (16) is characterized by:

said data outputs of said microprocessor (73) including a clockwise output and a counterclockwise output, said interface circuit (72) generating an inhibit signal as a logical combination of said clockwise and counterclockwise outputs.

6. An electronic control circuit as defined in claim 5, wherein said desirable combinations of conductive and non-conductive states of said switching elements (74–77) include a clockwise rotation state, a counterclockwise rotation state, a motor brake state, and at least one demagnetization state, wherein said said motor brake state results from said first and third switching elements (74,76) being in a different state of conduction than said second and fourth switching elements (75,77), and wherein said demagnetization state results from one of said switching elements (74–77) being in said conductive state and the other three of said switching elements (74–77) being in said non-conductive state.

7. An electronic control circuit as defined in claim 6, wherein said desirable combinations of conductive and non-conductive states of said switching elements (74–77) include a clockwise demagnetization state and a counter-clockwise demagnetization state, wherein said clockwise demagnetization state results from said one of said switching elements (74–77) being in said conductive state and the other three of said switching elements (74–77) being in said non-conductive state, and said counterclockwise demagnetization state results from a second one of said switching elements (74–77) being in said conductive state and the remaining three of said switching elements (74–77) being in said non-conductive state.

8. An electronic control circuit as defined in claim 5, wherein said interface circuit (72) is connected to said microprocessor to receive n commands from said microprocessor (73), and wherein said motor drive circuit (70) has $2^n$–m desirable combinations of conductive and non-conductive states of said switching elements (74–77) where m is an integer and $0 < m < 2^{n-1}$.

* * * * *